9406X
Duff & Murphy,
Steam Puppet Valve.
Patented Feb. 17, 1836.
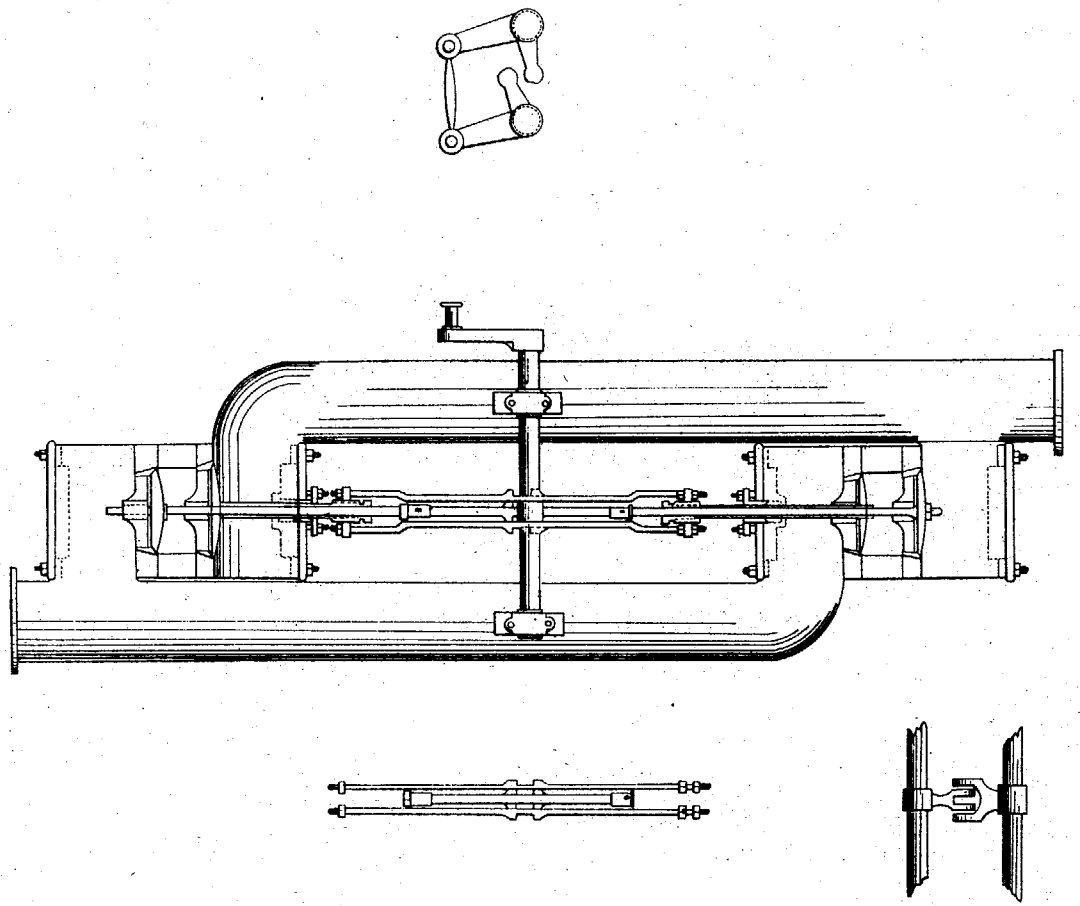

94062X Feb 17 1836 [illegible] 15

William Duff and Thomas J. Murphy
Letters Patent

The schedule referred to in these Letters Patent and making part of the same containing a description in the words of the said William Duff and Thomas Murphy themselves of their Improvement in the manner of raising and depressing the puppet valves of Steam Engines

---

To all to whom these presents shall come. Be it known that we William Duff and Thomas Murphy of Baltimore in the County of Baltimore and State of Maryland have invented a new and useful improvement in the manner of raising or depressing the puppet or the steam & exhausting valves in Steam Engines and that the following is a full and exact description of the construction and mode of operation thereof, as invented & improved by us. The object of this improvement is to place the stirrups & rods by which the valves of the top & bottom chests are raised or shut in a much better form of construction by which we are enabled to arrange them between the side pipes & directly beneath the top & above the lower valves so as to be able to lift or depress the stirrups & stems thereof by means of a perpendicular or direct line between them & through their centres instead of the present plan of placing them on the outside of the side pipes to operate on the valves by means of lifters from the sides thereof projecting horizontally or by band gear, one set of lifters being necessary to each chest; as the stems of the valves are not connected & both set of stems & lifters &c. are placed in the same position, or rising above their chests which arrangement occasions great embarrassment from the springing and tremulous motion attending the great length of these straps & the necessary precautions to brace against them. Our improvement consists in the following arrangement of these straps and stems so as to remedy these defects and produce the advantages we contemplate thereby. The position of the valves and chests being the same as usual, we connect the top steam valve & the bottom exhausting valve by means of a long straight stem reaching from one to the other (which we call the male stem as it is to work
within 326. 9406X within another hollow one called a female stem) and that portion of it which
is to work through the stuffing boxes on the female stem), placed between the
top & bottom shafts we call the valve stem and is made round. The remainder
which connects these two parts may be either round or square and stouter so as
to give strength from the centre to avoid springing is called the rod. and is
to have at each end a socket to admit the stem to be screwed into by a key,
though one will have in addition a female screw into which the rod will
enter so that it may be lengthened or shortened at pleasure. About the centre
of this rod are two lugs on each side presenting the appearance of a square
mortise with shoulders for the purpose of receiving the forked lifter from one
of the rock shafts which is to be placed on one side of the side pipes directly oppo-
site & by the rocking of which with the lifter the up & down motion is given
to the rod and stems of the valves. The top exhausting valve & the bottom steam
valve are connected by means of two straps, placed outside of the rod & stems
just described, though still between the side pipes & fastened on to the stuffing
boxes of the male valve stems by means of lugs & screws. these boxes are screwed
on to the female stems as usual which work through boxes on the bonnet of the
top chest & of the bottom chest: These straps are provided with two lugs on the
outside of each or next to the side pipes so as to produce the same kind of shoul-
ders as are formed on the rod & stems already described as situated between
the two straps, they are taken hold of by a forked lifter from another rocking
shaft placed on the opposite side of the side pipes to the one already describ-
ed. so that by its rocking these straps are raised or depressed in like manner
as the rod and stems, though in different directions or alternately which is
provided for by connecting the arms on the rocking shaft by means of a rod
they having both placed at the same end for that purpose and are thus made
to rock at the same time. The best situation for the eccentric pin to communi-
cate the motion to the shafts will be on the arm of one of them. The same prin-
ciples we contemplate to use where the valves or valve stems & straps are
separated and made to work one by the side of the other instead of one with-
in the other. What we claim as our invention & [illegible] [illegible] Letters Patent
for is first the arrangement of the valve stems in the top chest in an inverted
position so as to be connected by means of the rod with the stem of the valve
in

9406X

327 in the lower chest, in a direct line. Secondly. The connection by means of the straps above set forth of the stuffing box of the female stem of the top chest which box is also inverted so as to be thus connected in a straight line with the stuffing box of the lower chest and finally the adaptation of the two connected rocking shafts as above described to produce by means of the lifters & legs the alternate motion of the stems & straps Witnesses James McKell William Chicken William Duff Thos Murphy Ex Ca[illegible]

1035 nb

Drawing